United States Patent Office 3,699,104
Patented Oct. 17, 1972

3,699,104
8-CHLORO-10-(1-PIPERAZINYL) - 10,11 - DIHYDRO-DIBENZO[b,f]THIEPIN AS A CENTRAL NERVOUS DEPRESSANT
Walter Schindler, Riehen, near Basel, Erich Schmid, Basel, and Armin Züst, Birsfelden, Basel-Land, Switzerland, assignors to Geigy Chemical Corporation, Ardsley, N.Y.
No Drawing. Filed Feb. 17, 1969, Ser. No. 799,904
Claims priority, application Switzerland, Feb. 21, 1968, 2,529/68; Jan. 31, 1969, 1,592/69
Int. Cl. C07d 5/70
U.S. Cl. 260—268 TR                 3 Claims

ABSTRACT OF THE DISCLOSURE

8 - chloro - 10-(1-piperazinyl)-10,11-dihydro-dibenzo-[b,f] thiepin and the pharmaceutically acceptable acid addition salts thereof have a depressant effect on the central nervous system; pharmaceutical compositions comprising these compounds and methods of producing a depressant effect in warm-blooded animals are provided.

DETAILED DISCLOSURE

This invention relates to a piperazinyl-dibenzothiepin derivate, a process for the production thereof, pharmaceutical compositions containing this compound or a pharmaceutically acceptable acid addition salt thereof and the use thereof.

More particularly, the invention relates to the compound of the formula

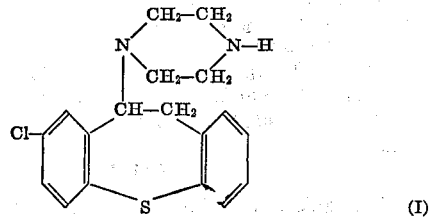

and the pharmaceutically acceptable acid addition salts thereof.

This compound has been found to have a general depressant effect on the central nervous system on oral, rectal or parenteral administration. It reduces motility, potentiates the action of anesthetics and exhibits a positive effect in the "test de la traction." It furthermore has been found to have sympathicolytic, antiemetic and antiserotonin activities. In comparison with its central depressant properties, it has a low cataleptic action. This is of advantage insofar as the influence on the extrapyramidal system is low.

These properties in combination with a favorable low toxicity, render the compound of the invention and the pharmaceutically acceptable acid addition salts thereof suitable for the treatment of states of tension and agitation.

The pharmacological properties of the compound of the invention are determined in experimental animals by various standard test methods [cp. R. Domenjoz and W. Theobald, Arch. Int. Pharmacodyn. 120, 450 (1959); W. Theobald et al., Arzneimittelforsch. 17, 561 (1967); W. Theobald et al., Arch. int. Pharmacodyn. 148, 560 (1964)].

Thus it is demonstrated that 8-chloro-10-(1-piperazinyl)-10,11-dihydro-dibenzo[b,f]thiepin dihydrochloride, on administration of about 0.9 mg./kg. intraperitoneally or about 3 mg./kg. orally to mice, decreases the spontaneous orientation motility to a very considerable extent.

The same compound, administered in amounts of about 0.48 mk./kg. subcutaneously or about 3.5 mg./kg. orally to mice, prevents about 50% of the animals, hanging on to a wire with their front paws, from pulling up and gripping the wire with their hind paws (test de la traction).

The same compound, administered in amounts of about 5 to 100 mg./kg. orally to mice, anesthetised intraperitoneally with 40 mg./kg. of the short-acting anesthetic N,N-diethyl-2-methoxy-4-allyl-phenoxyacetic acid amide, potentiates, i.e. prolongs the effect of the anesthetic to a very significant extent. The cataleptic activity is determined in rats and is found to be advantageously low.

The compound of Formula I is produced, according to the invention, by hydrolysing a compound of the Formula II

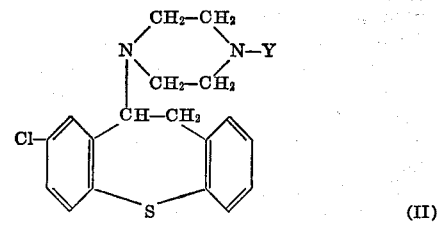

wherein Y represents a radical which can be replaced by hydrogen by means of hydrolysis, and optionally converting the obtained reaction product with an inorganic or organic acid into an addition salt.

Radicals Y which can be converted by hydrolysis into the hydrogen atom are, for example, acyl radicals, e.g. lower alkanoyl groups such as the acetyl group, arylcarbonyl groups such as the benzoyl group, radicals of monofunctional derivatives of carbonic acid or thiocarbonic acid such as, e.g. the methoxycarbonyl group, ethoxycarbonyl group, phenoxycarbonyl group or the benzyloxycarbonyl group, or the corresponding thiocarbonyl groups. The hydrolysis can be performed using an alkali metal hydroxide, e.g. potassium or sodium hydroxide, preferably at boiling temperature either in a higher-boiling organic solvent containing hydroxyl groups such as, e.g. ethylene glycol or diethylene glycol, or in a lower monoalkyl ether of a suchlike glycol and, in particular, in a lower alkanol, e.g. methanol or ethanol.

Starting materials of Formula II can be produced, for example, starting with the 8,10-dichloro-10,11-dihydro-dibenzo[b,f]thiepin, which is described in U.S. Pat. No. 3,351,599. This compound is reacted for example with 1-piperazine carboxylic acid esters, e.g. with the methyl, ethyl, phenyl or benzyl ester, to give the corresponding esters of the 4-(8-chloro-10,11-dihydro-dibenzo[b,f]thiepin-10-yl)-1-piperazine carboxylic acid. The corresponding thiocarboxylic acid esters can be produced analogously. In addition, compounds of the general Formula II, which are substituted in a 4-position of the piperazine ring by a lower alkanoyl group, e.g. the acetyl group, or by an arylcarbonyl group, e.g. the benzoyl group, can likewise be analogously produced. Starting with, e.g. 8,10-dichloro-10,11-dihydro-dibenzo[b,f]thiepin, this compound is reacted with the corresponding piperazine derivatives, e.g. with the 1-acetyl or 1-benzoyl piperazine.

The compound of Formula I obtained using the process according to the invention is then optionally converted, in the usual manner, into its addition salts with inorganic and organic acids. For example, a solution of the compound of Formula I in an organic solvent is mixed with the acid desired as the salt component or with a solution of the acid. For the reaction, organic solvents are preferably chosen, in which the formed salt has low solubility, so that it can be separated by filtration. Such solvents are, e.g.

methanol, acetone, methyl-ethyl ketone, acetone/ethanol, methanol/ether or ethanol/ether.

For use as medicaments, pharmaceutically acceptable salts can be used in place of free bases, i.e. salts with acids, the anions of which are not toxic in the case of the dosages in question. It is moreover of advantage if the salts to be used as medicaments crystallise well and are not, or only slightly, hydroscopic. For salt formation of the compounds of the Formula I, it is possible to use, e.g. hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicylic acid, phenyl acetic acid, mandelic acid and embonic acid.

As mentioned above, the new active substances are administered orally, rectally or parenterally. The dosage depends on the manner of administration, the species, the age of the individuum, and on the particular condition to be treated. The daily dosages of the free base or of pharmaceutically acceptable salts thereof vary between 0.1 mg./kg. and 10.5 mg./kg. for warm blooded animals. Suitable dosage units such as dragées, tablets, suppositories or ampoules, preferably contain 5–200 mg. of the compound of the Formula I or of a pharmaceutically acceptable salt thereof as active substance according to the invention.

Dosage units for oral administration preferably contain as active substance between 1–90% of the compound of the Formula I or of a pharmaceutically acceptable salt thereof. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units for oral administration are hard capsules made of gelatine as well as soft, closed capsules made of gelatine and a softener such as glycerin. The hard capsules preferably contain the active substance as a granulate, e.g. in admixture with fillers such as maize starch, and/or lubricants such as talcum or magnesium stearate and, optionally, stabilisers such as sodium metabisulphite ($Na_2S_2O_5$) or ascorbic acid. In soft capsules, the active substance is preferably dissolved or suspended in suitable liquids such as liquid polyethylene glycols, whereby stabilizers can also be added.

Suitable dosage units for rectal administration are for example suppositories consisting of a combination of the active substance with a suppository foundation material. Examples of the latter are: natural or synthetic triglycerides, paraffin hydrocarbons, polyethylene glycols or higher alkanols. Gelatine rectal capsules are also suitable which consist of a combination of the active substance and a foundation material. Examples of the latter are: liquid triglycerides, polyethylene glycols or paraffin hydrocarbons.

Ampoules for paraenteral, particularly intramuscular, administration preferably contain a water-soluble salt as active substance in a concentration of preferably 0.5–5%, optionally together with suitable stabilisers and buffer substances, in an aqueous solution.

The following examples will serve to further typify the nature of the present invention, but should not be construed as a limitation on the scope thereof.

EXAMPLE 1

47.5 g. of 1-piperazine carboxylic acid ethyl ester are added to a solution of 28.12 g. of 8-10-dichloro-10,11-dihydro-dibenzo[b,f]thiepin in 50 ml. of benzene. The reaction mixture is refluxed for 15 hours, cooled to 20° and mixed with 100 ml. of 2 N ammonia. The crude free base precipitates, whereupon it is extracted three times using each time 150 ml. of methylene chloride/ether (1:2). The organic extract is washed with water, dried over magnesium sulphate and concentrated by evaporation in vacuo. To the thus obtained crude 4-(8-chloro-10,11-dihydro-dibenzo[b,f]thiepin - 10 - yl)-1-piperazine carboxylic acid ethyl ester is added a solution of 61.0 g. of pulverised potassium hydroxide in 350 ml. of absolute ethanol. The obtained, cloudy solution is refluxed for 12 hours, mixed with 70 ml. of water, cooled and concentrated by evaporation in vacuo. The residue is taken up in ether/methylene chloride (2:1) and water. The organic phase is separated, washed with water, dried over sodium sulphate and concentrated by evaporation. The residue is dissolved in 250 ml. of ether and 50 ml. of ethanol and the solution is neutralised with ethereal hydrochloric acid. The 8 - chloro-10-(1-piperazinyl)-10,11-dihydro-dibenzo[b,f]thiepin dihydrochloride precipitates. It is filtered of, washed with a little acetone, whereupon it melts at 195–200°.

The following prescriptions further illustrate the production of tablets, dragées, capsules, suppositories and ampoules.

EXAMPLE 2

250 g. of 8-chloro-10-(1-piperazinyl)-10,11-dihydro-dibenzo[b,f]thiepin dihydrochloride are mixed with 175.80 g. of lactose and 169.70 g. of potato starch. The mixture is moistened with an alcoholic solution of 10 g. of stearic acid and is granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets, each weighing 100 mg. and each containing 25 mg. of active substance. Optionally, the tablets can be provided with grooves for more accurate adjustment of the dosage amount.

EXAMPLE 3

A granulate is produced from 250 g. of 8-chloro-10-(1-piperazinyl) - 10,11 - dihydro-ribenzo[b,f]thiepin dihydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are subsequently coated with a concentrated syrup made from 502.28 g. of crystallised saccharose, 6 g. of shellac, 10 g. of gum arabic, 0.22 g. of dyestuff and 1.5 g. of titanium dioxide, and are then dried. The obtained dragées each weigh 120 mg. and each contain 25 mg. of active substance.

EXAMPLE 4

To produce 1000 capsules each containing 25 mg. of active substance, 25 g. of 8-chloro-10-(1-piperazinyl)-10,11-dihydro-dibenzo[b,f]thiepin dihydrochloride are mixed with 248.0 g. of lactose. The mixture is evenly moistened with an aqueous solution of 2.0 g. of gelatine and is granulated through a suitable sieve (e.g. Sieve III, Ph. Helv. V). The granulate is mixed with 10.0 g. of dried maize starch and 15.0 g. of talcum and the mixture is uniformly filled into 1000 hard gelatine capsules Size 1.

EXAMPLE 5

A suppository foundation material is prepared from 2.5 g. of 8 - chloro-10-(1-piperazinyl)-10,11-dihydro-dibenzo-[b,f]thiepin dihydrochloride and 167.5 of adeps solidus, and from the mixture are filled 100 suppositories each containing 25 mg. of active substance.

EXAMPLE 6

A solution of 25 g. of 8-chloro-10-(1-piperazinyl)-10,11-dihydro-dibenzo[b,f]thiepin dihydrochloride in one liter of water is filled into 1000 ampoules and sterilised. An ampoule contains a 2.5% solution of 25 mg. of active substance.

What is claimed is:
1. 8 - chloro-10-(1-piperazinyl)-10,11-dihydro-dibenzo-[b,f]thiepin.
2. Pharmaceutically acceptable acid addition salts of the compound as defined in claim 1.
3. The dihydrochloride of the compound as defined in claim 1.

References Cited

UNITED STATES PATENTS

| | | | |
|---|---|---|---|
| 3,337,554 | 8/1967 | Jilek | 260—268 |
| 3,351,599 | 11/1967 | Protiva et al. | 260—268 |
| 3,359,271 | 12/1967 | Schindler | 260—268 |
| 3,509,154 | 4/1970 | Fouche | 260—268 |

DONALD G. DAUS, Primary Examiner

U.S. Cl. X.R.

260—268 C, 327 B; 424—250